United States Patent
You

(10) Patent No.: US 7,495,468 B2
(45) Date of Patent: Feb. 24, 2009

(54) SEMICONDUCTOR MEMORY DEVICE WITH ON DIE TERMINATION CIRCUIT

(75) Inventor: Min-Young You, Kyoungki-do (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 0 days.

(21) Appl. No.: 11/647,176

(22) Filed: Dec. 29, 2006

(65) Prior Publication Data

US 2008/0001622 A1    Jan. 3, 2008

(30) Foreign Application Priority Data

Jun. 30, 2006    (KR) ............... 10-2006-0061407

(51) Int. Cl.
    *H03K 19/003* (2006.01)
(52) U.S. Cl. ..................... 326/30; 326/28
(58) Field of Classification Search ........... 326/21, 326/26, 30, 81–83, 86–87; 327/108; 365/230.01–230.06
    See application file for complete search history.

(56) References Cited

U.S. PATENT DOCUMENTS 6,747,475 B2   6/2004   Yuffe et al.
7,092,299 B2 * 8/2006   Kwak et al. .......... 365/198
7,312,627 B2 * 12/2007  An ....................... 326/30

FOREIGN PATENT DOCUMENTS

| KR | 10-2004-0062716 A | 7/2004 |
|----|-------------------|--------|
| KR | 10-2005-0022836 A | 3/2005 |
| KR | 10-2006-0038234 A | 5/2006 |
| KR | 10-2006-0038745 A | 5/2006 |

* cited by examiner

Primary Examiner—Rexford Barnie
Assistant Examiner—Christopher Lo
(74) Attorney, Agent, or Firm—McDermott Will & Emery LLP

(57) ABSTRACT

A semiconductor memory device includes: a termination resistance supply unit connected to a pad to supply termination resistances corresponding to a plurality of control signals; a decoding unit for decoding the plurality of ODT setting signals to output an ODT enable signal and a plurality of decoding output signals; a control signal generating unit for receiving the plurality of decoding output signals to output the plurality of control signals in response to an ODT off signal and a clock signal; and an output control unit for activating one of the plurality of control signals when a read enable detection signal is activated.

24 Claims, 5 Drawing Sheets

SEMICONDUCTOR MEMORY DEVICE WITH ON DIE TERMINATION CIRCUIT

FIELD OF THE INVENTION

The present invention relates to a semiconductor memory device, and more particularly, to a semiconductor memory device with an on die termination (ODT) circuit for reducing current consumption and preventing a voltage level of output data from being distorted.

DESCRIPTION OF RELATED ART

Various semiconductor memory devices implemented with integrated circuit (IC) chips, such as CPU, memory, gate arrays, etc., are built in various electrical products, such as personal computers, servers, workstations, etc. In most cases, the semiconductor device includes a receiver circuit for receiving various external signals through input pads, and an output circuit for outputting internal signals externally through output pads.

As the operating speed of the electrical products becomes higher, a swing width of a signal interfacing between the semiconductor devices is made narrower in order to minimize a delay time of a signal transfer. However, as the swing width of the signal becomes narrower, the influence of external noise increases and thus the signal reflectivity according to impedance mismatching at an interface unit becomes a serious impediment. The impedance mismatching is caused by the external noise and the variations in power supply voltage, operating temperature, and manufacturing process, and so on. The impedance mismatching makes high-speed data transmission difficult and may distort data output from a data output terminal of a semiconductor device. When a semiconductor device of a receiving side receives the distorted data, a setup/hold fail or a misjudgment of an input level may often occur.

Therefore, the semiconductor device of the receiving side that requires a high operating speed adopts an impedance matching circuit near a pad within the IC chip. The impedance matching circuit is called an on chip termination (OCT) circuit or an on die termination (ODT) circuit. In the ODT scheme, a source termination is carried out in a transmitting side by an output circuit, and a parallel termination is carried out in a receiving side by a termination circuit connected in parallel to a receiver circuit that is connected to an input pad.

FIG. 1 is an ODT circuit of a conventional semiconductor memory device.

The conventional ODT circuit includes a decoder 10, an input buffer 20, a control signal generator 30, and a termination resistance part 40. The decoder 10 decodes a plurality of ODT setting signals A2 and A6 to output an ODT enable signal ODT_ENB and a plurality of decoding output signals DC_OUT. The input buffer 20 receives an external ODT signal ODT corresponding to a reference voltage VREF to output an ODT off signal ODT_OFF in response to the ODT enable signal ODT_ENB. The control signal generator 30 receives the plurality of decoding output signals DC_OUT to output a plurality of pull-up control signals ODT_PU<0:2> and a plurality of pull-down control signals ODT_PD<0:2> in synchronization with a clock signal CLK in response to the ODT off signal ODT_OFF. The termination resistance part 40 is connected to a pad DQ_PAD and supplies termination resistances corresponding to the plurality of pull-up control signals ODT_PU<0:2> and the plurality of pull-down control signals ODT_PD<0:2>.

In the termination resistance part 40, all output nodes are commonly connected. The termination resistance part 40 includes a plurality of PMOS transistors responsive to the pull-up control signals ODT_PU<0:2>, a plurality of NMOS transistors responsive to the pull-down control signals ODT_PD<0:2>, and a plurality of resistors connected therebetween.

Upon operation of the ODT circuit, the decoder 10 decodes the plurality of ODT setting signals A2 and A6 to output the ODT enable signal ODT_ENB and the plurality of decoding output signals DC_OUT.

When the ODT enable signal ODT_ENB is activated, the input buffer 20 receives the external ODT signal ODT corresponding to the reference voltage VREF and outputs the ODT off signal ODT_OFF having an internal voltage level.

When the ODT off signal ODT_OFF is deactivated, the control signal generator 30 activates corresponding signals among the plurality of pull-up control signals ODT_PU<0:2> and the plurality of pull-down control signals ODT_PD<0:2> in response to the plurality of decoding output signals DC_OUT. When the ODT off signal ODT_OFF is activated, the control signal generator 30 deactivates the plurality of pull-up control signals ODT_PU<0:2> and the plurality of pull-down control signals ODT_PD<0:2> regardless of the plurality of decoding output signals DC_OUT.

The termination resistance part 40 supplies the termination resistances corresponding to the plurality of pull-up control signals ODT_PU<0:2> and the plurality of pull-down control signals ODT_PD<0:2> generated through the above-described procedures. As the number of the MOS transistors turned on in response to the pull-up control signals ODT_PU<0:2> and the pull-down control signals ODT_PD<0:2> increases, the number of the resistors connected in parallel to the MOS transistors increase. Therefore, the termination resistance decreases. On the contrary, as the number of the MOS transistors decreases, the termination resistance increases.

FIG. 2 is a timing diagram of a write operation and a read operation of a semiconductor memory device with an ODT circuit. In FIG. 2, it is assumed that the termination resistance is set to 75 Ω.

It can be seen from FIG. 2 that the termination resistance continuously maintains 75 Ω during the write operation and the read operation.

If the termination resistance continues to be in an "ON" state, unnecessary current consumption occurs. However, if the termination resistance is turned off in order to prevent the current consumption during the read operation, the characteristics of the semiconductor memory device are degraded. For example, the read latency may not be satisfied due to the on/off delay time of the termination resistance. For this reason, the termination resistance is maintained even though unnecessary power consumption occurs during the read operation.

The read latency means a delay time between a time point when a read command is applied and a time point when data is output by the read command.

According to the prior art in which the termination resistance is supplied regardless of the driving of the device, when data is output through the data pad during the read operation, the voltage level of the output data is distorted by a resistance ratio of the termination resistance to the output driver. This distortion causes product failure, resulting in the yield reduction.

SUMMARY OF THE INVENTION

It is, therefore, an object of the present invention to provide an internal voltage generator for a semiconductor memory device with an ODT circuit, which can reduce current consumption and prevent a voltage level of output data from being distorted.

In accordance with an aspect of the present invention, there is provided a semiconductor memory device including: a termination resistance supply unit connected to a pad to supply termination resistances corresponding to a plurality of control signals; a decoding unit for decoding the plurality of ODT setting signals to output an ODT enable signal and a plurality of decoding output signals; a control signal generating unit for receiving the plurality of decoding output signals to output the plurality of control signals in response to an ODT off signal and a clock signal; and an output control unit for activating one of the plurality of control signals when a read enable detection signal is activated.

In accordance with a further aspect of the present invention, there is provided a semiconductor memory device including: a pad; and a termination resistance supply unit connected to the pad to supply termination resistances, wherein a termination resistance during a read operation is different from that during a write operation.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

A semiconductor memory device with an ODT circuit in accordance with exemplary embodiments of the present invention will be described in detail with reference to the accompanying drawings.

Figure 1:
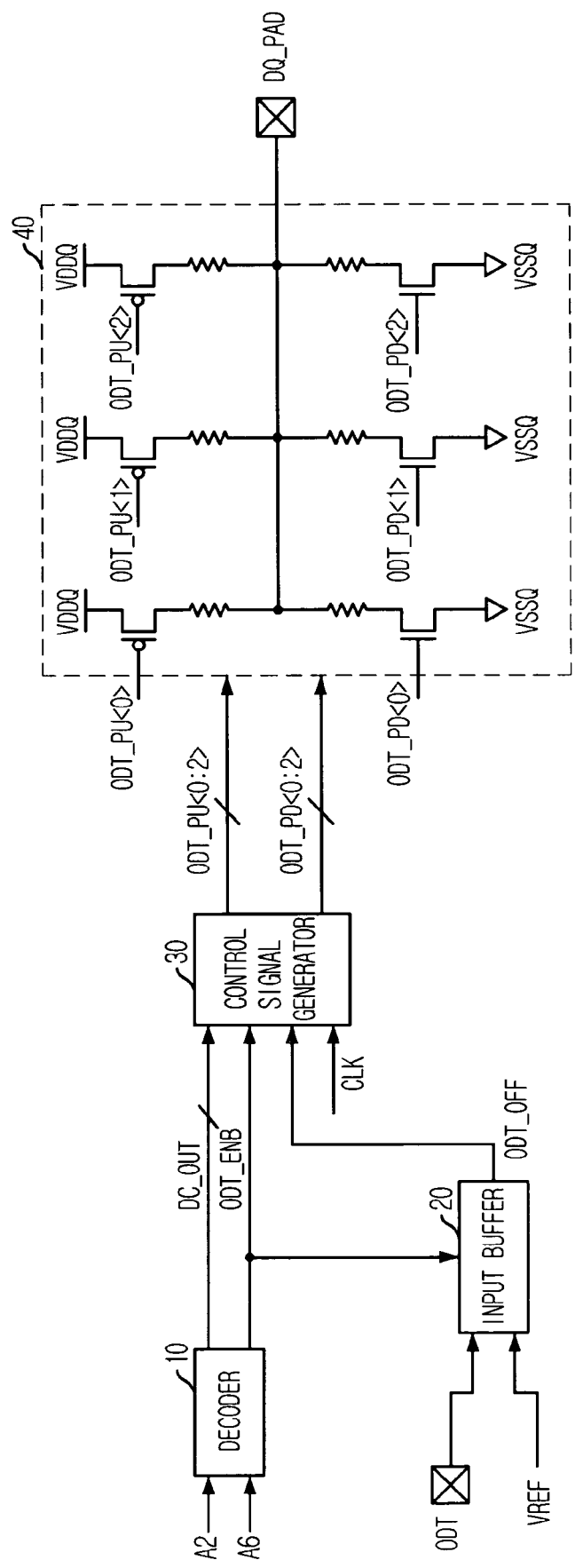
FIG. 1 is an ODT circuit diagram of a conventional semiconductor memory device.
Figure 2:
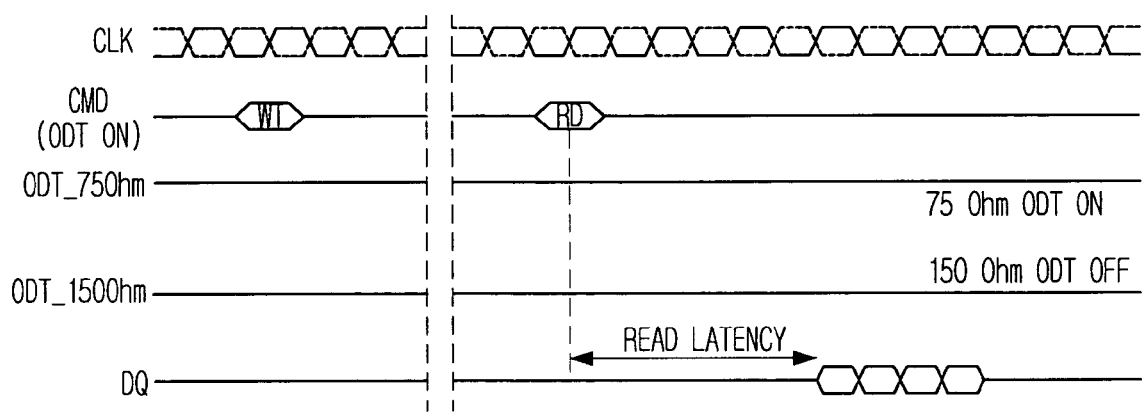
FIG. 2 is a timing diagram for a write operation and a read operation of a semiconductor memory device with an ODT circuit.
Figure 3:
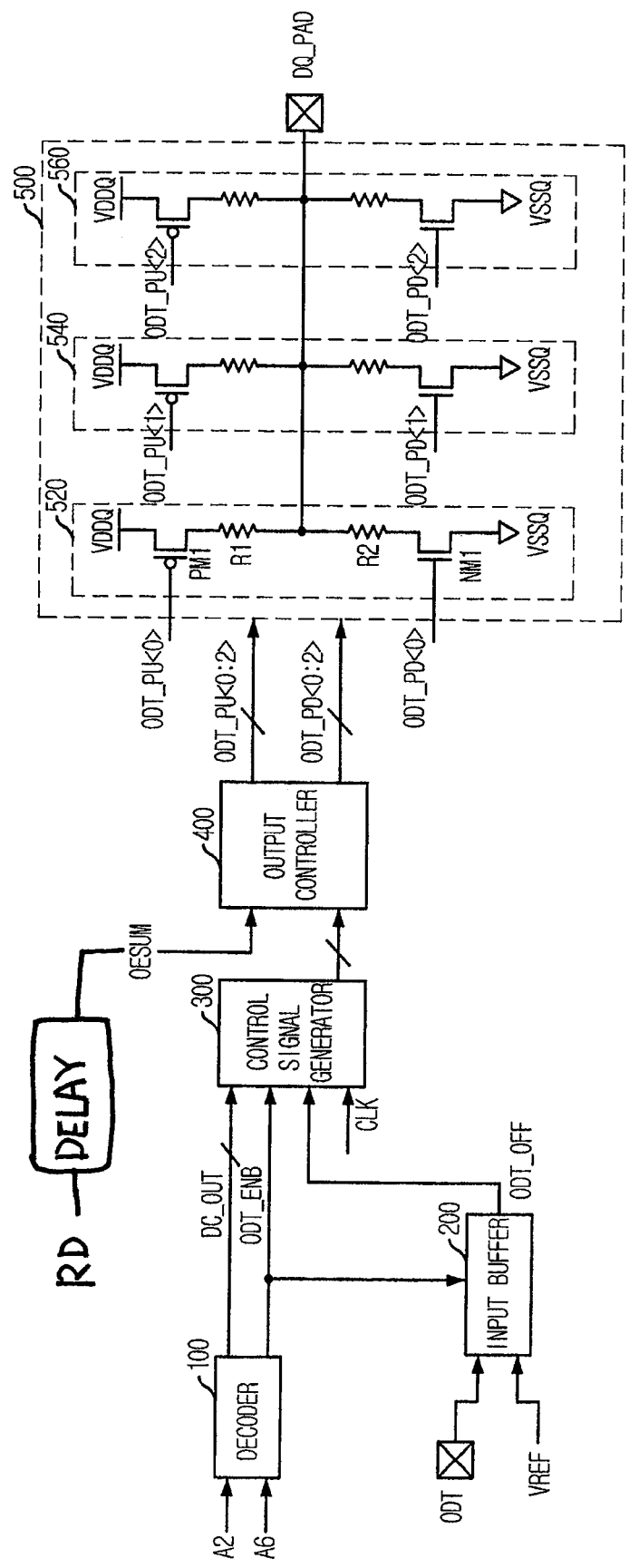
FIG. 3 is an ODT circuit diagram of a semiconductor memory device in accordance with an embodiment of the present invention.

FIG. 3 is a circuit diagram of an ODT circuit of a semiconductor memory device in accordance with an embodiment of the present invention.

The ODT circuit includes a decoder 100, an input buffer 200, a resistance controller 300 and 400, and a termination resistance part 500. The decoder 100 decodes a plurality of ODT setting signals A2 and A6 to output an ODT enable signal ODT_ENB and a plurality of decoding output signals DC_OUT. The input buffer 200 receives an external ODT signal ODT corresponding to a reference voltage VREF to output an ODT off signal ODT_OFF in response to the ODT enable signal ODT_ENB. The resistance controller 300 and 400 receives the plurality of decoding output signals DC_OUT to output a plurality of pull-up control signals ODT_PU<0:2> and a plurality of pull-down control signals ODT_PD<0:2> in response to the ODT off signal ODT_OFF, a read enable detection signal OESUM, and a clock signal CLK. The termination resistance part 500 is connected to a pad DQ_PAD and supplies termination resistances corresponding to the plurality of pull-up control signals ODT_PU<0:2> and the plurality of pull-down control signals ODT_PD<0:2>.

The resistance controller 300 and 400 includes a control signal generator 300 and an output controller 400. The control signal generator 300 receives the plurality of decoding output signals DC_OUT to output the plurality of pull-up control signals ODT_PU<0:2> and the plurality of pull-down control signals ODT_PD<0:2> in response to the ODT off signal ODT_OFF and the clock signal CLK. The output controller 400 controls the output of the plurality of pull-up control signals ODT_PU<0:2> and the plurality of pull-down control signals ODT_PD<0:2> in response to the read enable detection signal OESUM.

In the termination resistance part 500, all output nodes are commonly connected. The termination resistance part 500 includes first to third resistance units 520, 540 and 560 that are turned on in response to the pull-up control signals ODT_PU<0:2> and the pull-down control signals ODT_PD<0:2> to provide resistances.

Since the first to third resistance units 520, 540 and 560 have the same circuit configuration, only the first resistance unit 520 will be described below.

The first resistance unit 520 includes a PMOS transistor PM1, a first resistor R1, an NMOS transistor NM1, and a second resistor R2. The PMOS transistor has a gate receiving the pull-up control signal ODT_PU<0> and a source connected to a first internal voltage terminal VDDQ. The first resistor R1 is connected between a drain of the PMOS transistor PM1 and an output node. The NMOS transistor NM1 has a gate receiving the pull-down control signal ODT_PD<0> and a source connected to a second internal voltage terminal VSSQ. The second resistor R2 is connected between a drain of the NMOS transistor NM1 and the output node.

The read enable detection signal OESUM is generated by performing a logical AND operation of flag signals generated for controlling data output timing such that data are output with a delay corresponding to column address strobe (CAS) latency in response to the read command. For example, when at least one of output enable signals for controlling the data output is activated, the read enable detection signal OESUM is activated. Therefore, any signals can be used as the read enable detection signal OESUM if they can detect the read operation. For example, the read enable detection signal OESUM may be a signal produced by delaying the read command by a predetermined time.

Figure 5:
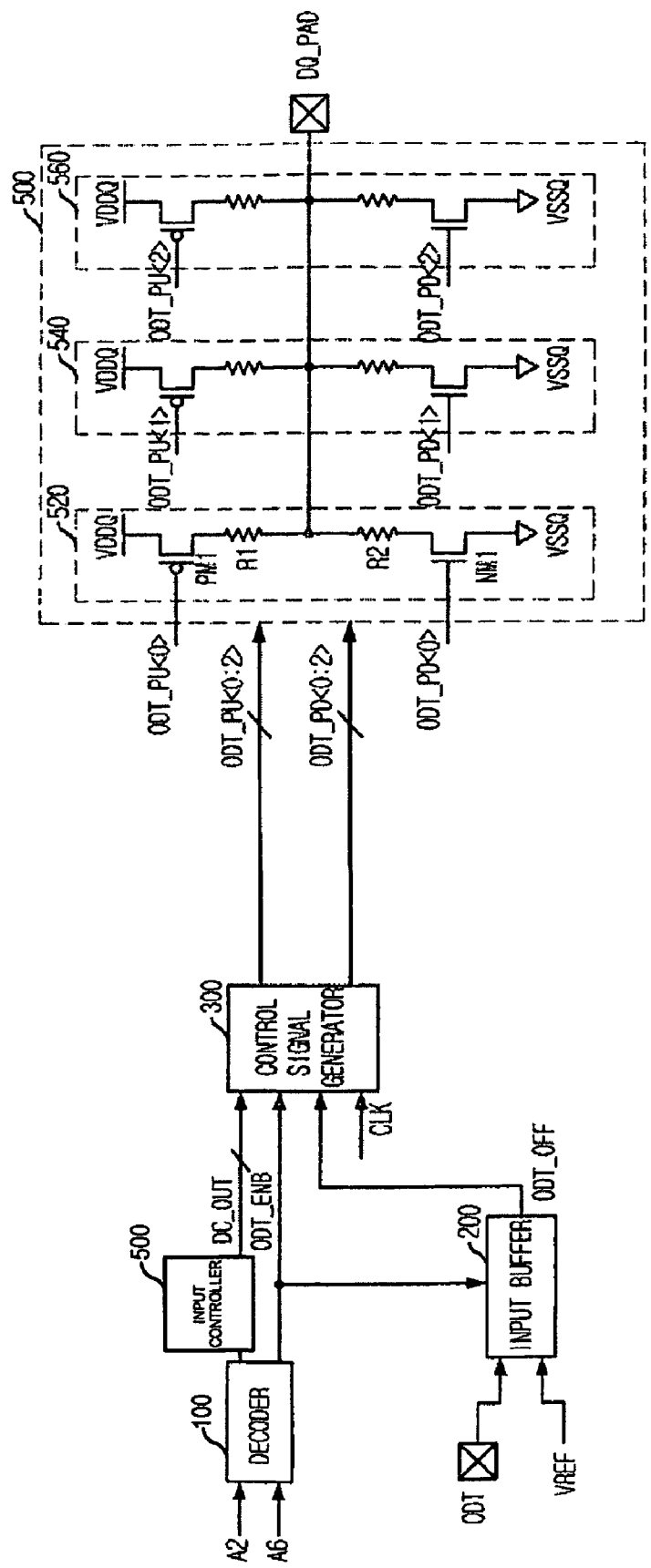
FIG. 5 is an ODT circuit diagram of a semiconductor memory device in accordance with another embodiment of the present invention.

Referring to FIG. 5, instead of the output controller 400, the resistance controller may include an input controller for controlling the applying of the decoding output signals DC_OUT to the control signal generator 300 in response to the read enable detection signal OESUM. In this case, the input controller activates at least one of the decoding output signals DC_OUT such that the termination resistance has the greatest value when the read enable detection signal OESUM is activated.

In this way, the ODT circuit makes the termination resistance have the greatest value, regardless of the input ODT setting signals A2 and A6, by using the output controller 400 to control the output of the pull-up control signals ODT_PU<0:2> and the pull-down control signals ODT_PD<0:2> in response to the read enable detection signal OESUM activated during the read operation.

Because the termination resistance has the greatest value during the read operation, current consumption is minimized and a logic level of data output through the pad DQ_PAD is not distorted.

A process of adjusting the termination resistance according to a user's setting of an extended mode register set (EMRS) will now be described.

The user sets a desired resistance to an EMRS during an initial operation. At this time, signals set to the EMRS are the plurality of ODT setting signals A2 and A6.

Then, the decoder 100 decodes the plurality of ODT setting signals A2 and A6 to output the ODT enable signal ODT_ENB and the plurality of decoding output signals DC_OUT.

The input buffer 200 changes the external ODT signal ODT to the internal voltage level through the reference voltage VREF in response to the ODT enable signal ODT_ENB.

When the ODT off signal ODT_OFF is deactivated, the control signal generator 300 activates the pull-up control signals ODT_PU<0:2> and the pull-down control signals ODT_PD<0:2> in response to the decoding output signals DC_OUT. When the ODT off signal is activated, the control signal generator 300 deactivates the pull-up control signals ODT_PU<0:2> and the pull-down control signals ODT_PD<0:2>, regardless of the logic levels of the decoding output signals DC_OUT.

While the read enable detection signal OESUM is deactivated, the output controller 400 transfers the pull-up control signals ODT_PU<0:2> and the pull-down control signals ODT_PD<0:2>. On the contrary, while the read enable detection signal OESUM is activated, the output controller 400 activates one of the pull-up control signals ODT_PU<0:2> and one of the pull-down control signals ODT_PD<0:2>.

Therefore, when the read enable detection signal OESUM and the ODT off signal ODT_OFF are deactivated, the termination resistance part 500 is turned on or off in response to the activation of the pull-up control signals ODT_PU<0:2> and the pull-down control signals ODT_PD<0:2> and thus is connected to the pad DQ_PAD as the termination resistance set by the user. When the ODT off signal ODT_OFF is activated, the pull-up control signals ODT_PU and the pull-down control signals ODT_PD are all deactivated so that the termination resistance is off. On the contrary, when the read enable detection signal OESUM is activated, one of the pull-up control signals ODT_PU<0:2> and the pull-down control signals ODT_PD<0:2> is activated, regardless of the ODT setting signals A2 and A6. Therefore, the greatest termination resistance is supplied.

TABLE 1

| A6 | A2 | Rtt |
|---|---|---|
| 0 | 0 | ODT disable |
| 0 | 1 | 75 Ω |
| 1 | 0 | 150 Ω |
| 1 | 1 | 50 Ω |

As illustrated in Table 1, the user can set the termination resistance to one of 50 Ω, 75 Ω and 150 Ω by applying the ODT setting signals A2 and A6.

The turn-on resistances of the first to third resistance units 520, 540 and 560 are 150 Ω. When three resistance units are all turned on, three 150-Ω resistors are connected in parallel so that the termination resistance becomes 50 Ω. When two resistance units are turned on, two 150-Ω resistors are connected in parallel so that the termination resistance becomes 75 Ω. When one resistance unit is turned on, the termination resistance becomes 150 Ω.

Figure 4:
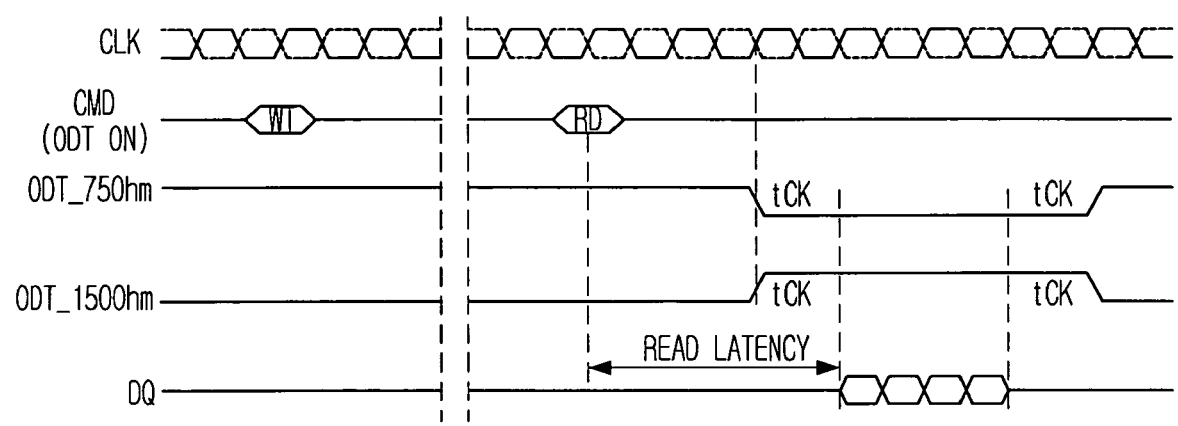
FIG. 4 is a timing diagram for a write operation and a read operation of a semiconductor memory device with an ODT circuit in accordance with an embodiment of the present invention.

FIG. 4 is a timing diagram for a write operation and a read operation of the semiconductor memory device with the ODT circuit in accordance with an embodiment of the present invention. In FIG. 4, it is assumed that the termination resistance is set to 75 Ω.

Referring to FIG. 4, while a write operation is carried out in response to a write command, the termination resistance continuously maintains 75 Ω, which is set by applying the plurality of ODT setting signals A2 and A6.

On the other hand, when a read operation is carried out in response to a read command, the read enable detection signal OESUM is activated and the termination resistance has 150 Ω, regardless of the plurality of ODT setting signals A2 and A6.

In accordance with the present invention, the semiconductor memory device with the ODT circuit supplies the greatest termination resistance during the read operation, regardless of the EMRS setting, and maintains the termination resistance set to the EMRS during all operations other than the read operation. Therefore, it is possible to prevent distortion in the level of the output data and current consumption during the read operation. In addition, the defect caused by distortion in the level of the output data can be reduced, improving the yield.

Specifically, the activation of the read enable detection signal is detected and the termination resistance increases. Because the read enable detection signal is a signal generated in response to the read command by performing a logical AND operation of flag signals for controlling the data output timing, the termination resistance is variable prior to the data output timing. Therefore, it is possible to prevent the characteristic degradation according to the adjustment of the termination resistance.

These effects are remarkably exhibited in the mobile products having the above-described semiconductor memory device.

The present application contains subject matter related to Korean patent application No. 2006-61407, filed in the Korean Intellectual Property Office on Jun. 30, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A semiconductor memory device, comprising:
a termination resistance supply unit connected to a pad to supply termination resistances corresponding to a plurality of control signals; and
a termination resistance control unit for decoding a plurality of on die termination (ODT) setting signals to output the plurality of control signals during operations other than a read operation, and setting the termination resistance to have a greatest value during the read operation in response to a read enable detection signal which is activated in the read operation, wherein the read enable detection signal is activated when at least one of a plurality of output enable signals for controlling data output is activated.

2. The semiconductor memory device of claim 1, wherein the termination resistance control unit includes:
a decoder for decoding the plurality of ODT setting signals to output an ODT enable signal and a plurality of decoding output signals;
a control signal generator for receiving the plurality of decoding output signals to output the plurality of control signals in response to an ODT off signal and a clock signal; and
an output controller for activating one of the plurality of control signals when the read enable detection signal is activated.

3. The semiconductor memory device of claim 2, further comprising an input buffer for changing a level of an external ODT signal to an internal voltage level based on a reference voltage to output the ODT off signal in response to the ODT enable signal.

4. The semiconductor memory device of claim 2, wherein the read enable detection signal is a flag generated for controlling data output timing such that data are output with a delay corresponding to a column address strobe (CAS) latency in response to a read command.

5. The semiconductor memory device of claim 1, wherein the termination resistance control unit includes:
a decoder for decoding the plurality of ODT setting signals to output an ODT enable signal and a plurality of decoding output signals;
an input controller for controlling the plurality of decoding output signals in response to the read enable detection signal; and
a control signal generator for receiving an output signal of the input controller to output the plurality of control signals in response to an ODT off signal and a clock signal.

6. The semiconductor memory device of claim 5, further comprising an input buffer for changing a level of an external ODT signal to an internal voltage level, based on a reference voltage, to output the ODT off signal in response to the ODT enable signal.

7. The semiconductor memory device of claim 5, wherein the read enable detection signal is a flag generated for controlling data output timing such that data are output with a delay corresponding to a column address strobe (CAS) latency in response to a read command.

8. The semiconductor memory device of claim 5, wherein the read enable detection signal is activated when at least one of a plurality of output enable signals for controlling data output is activated.

9. The semiconductor memory device of claim 1, wherein the termination resistance supply unit includes first to third resistance units turned on in response to an activation of a corresponding signal among the plurality of control signals, the first to third resistance units having a common output node, the termination resistance being output through the common output node.

10. The semiconductor memory device of claim 9, wherein each of the first to third resistance units includes:
a PMOS transistor having a gate receiving a first control signal and a source connected to a first internal voltage terminal;
a first resistor connected between a drain of the PMOS transistor and the output node;
an NMOS transistor having a gate receiving a second control signal and a source connected to a second internal voltage terminal; and
a second resistor connected between a drain of the NMOS transistor and the output node.

11. A method for driving a semiconductor memory device, comprising:
setting a termination resistance to have a greatest value during a read operation; and
setting the termination resistance to have a value based on an extended mode register set (EMRS) setting during operations other than the read operation,
wherein the termination resistance is set in response to a read enable detection signal which is activated in the read operation, and
wherein the read enable detection signal is activated when at least one of a plurality of output enable signals for controlling data output is activated.

12. The method of claim 11, wherein the setting of the termination resistance to have the greatest value includes:
detecting an applying of a read command; and
adjusting the termination resistance to the greatest value for a predetermined time.

13. The method of claim 12, wherein the setting of the termination resistance to have the value based on the EMRS setting includes:
decoding the EMRS setting to generate corresponding control signals; and
supplying the termination resistance according to the control signals.

14. A semiconductor memory device, comprising:
a pad;
a termination resistance supply unit connected to the pad to supply termination resistances; and
a termination resistance control unit for decoding a plurality of on die termination (ODT) setting signals to output a plurality of control signals for controlling the termination resistance supply unit in response to a read enable detection signal which is activated in the read operation, and
wherein a termination resistance during a read operation is different from that during a write operation, and
wherein the read enable detection signal is activated when at least one of a plurality of output enable signals for controlling data output is activated.

15. The semiconductor memory device of claim 14, wherein the termination resistance during the read operation is greater than that during the write operation.

16. The semiconductor memory device of claim 14, wherein the termination resistance control unit includes:
a decoder for decoding the plurality of ODT setting signals to output an ODT enable signal and a plurality of decoding output signals;
a control signal generator for receiving the plurality of decoding output signals to output the plurality of control signals in response to an ODT off signal and a clock signal; and
an output controller for activating one of the plurality of control signals when a read enable detection signal is activated.

17. The semiconductor memory device of claim 16, further comprising an input buffer for changing a level of an external ODT signal to an internal voltage level based on a reference voltage to output the ODT off signal in response to the ODT enable signal.

18. The semiconductor memory device of claim 16, wherein the read enable detection signal is a flag generated for controlling data output timing such that data are output with a delay corresponding to a column address strobe (CAS) latency in response to a read command.

19. The semiconductor memory device of claim 14, wherein the termination resistance control unit includes:
   a decoder for decoding the plurality of ODT setting signals to output an ODT enable signal and a plurality of decoding output signals;
   an input controller for controlling the plurality of decoding output signals in response to a read enable detection signal; and
   a control signal generator for receiving an output signal of the input controller to output the plurality of control signals in response to an ODT off signal and a clock signal.

20. The semiconductor memory device of claim 19, further comprising an input buffer for changing a level of an external ODT signal to an internal voltage level, based on a reference voltage, to output the ODT off signal in response to the ODT enable signal.

21. The semiconductor memory device of claim 19, wherein the read enable detection signal is a flag generated for controlling data output timing such that data are output with a delay corresponding to a column address strobe (CAS) latency in response to a read command.

22. The semiconductor memory device of claim 19, wherein the read enable detection signal is activated when at least one of a plurality of output enable signals for controlling data output is activated.

23. The semiconductor memory device of claim 14, wherein the termination resistance supply unit includes a plurality of resistance units turned on in response to an activation of a corresponding signal among the plurality of control signals, the resistance units having a common output node, the termination resistance being output through the common output node.

24. The semiconductor memory device of claim 23, wherein each of the resistance units includes:
   a PMOS transistor having a gate receiving a first control signal and a source connected to a first internal voltage terminal;
   a first resistor connected between a drain of the PMOS transistor and the output node;
   an NMOS transistor having a gate receiving a second control signal and a source connected to a second internal voltage terminal; and
   a second resistor connected between a drain of the NMOS transistor and the output node.

* * * * *